United States Patent
Yagasaki

(10) Patent No.: US 10,328,929 B2
(45) Date of Patent: Jun. 25, 2019

(54) HYBRID DRIVE APPARATUS

(71) Applicant: HONDA MOTOR CO., LTD., Tokyo (JP)

(72) Inventor: Toru Yagasaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 15/520,252

(22) PCT Filed: Aug. 27, 2015

(86) PCT No.: PCT/JP2015/074193
§ 371 (c)(1),
(2) Date: Apr. 19, 2017

(87) PCT Pub. No.: WO2016/063623
PCT Pub. Date: Apr. 28, 2016

(65) Prior Publication Data
US 2017/0313302 A1  Nov. 2, 2017

Related U.S. Application Data

(63) Continuation of application No. PCT/JP2015/074193, filed on Aug. 27, 2015.

(30) Foreign Application Priority Data

Oct. 20, 2014  (JP) ................................. 2014-213800

(51) Int. Cl.
*B60W 20/30*  (2016.01)
*B60L 50/16*  (2019.01)
(Continued)

(52) U.S. Cl.
CPC .............. *B60W 20/30* (2013.01); *B60K 6/24* (2013.01); *B60K 6/26* (2013.01); *B60K 6/36* (2013.01);
(Continued)

(58) Field of Classification Search
CPC .......... B60K 6/365; B60K 6/445; B60K 6/40; B60K 1/02; F16H 2037/0866; F16H 2200/2005
See application file for complete search history.

(56) References Cited

U.S. PATENT DOCUMENTS 8,469,860 B1 * 6/2013 Kaminsky .............. B60K 6/445
477/79
8,562,480 B1 * 10/2013 Mellet ..................... F16H 3/725
475/317
(Continued)

FOREIGN PATENT DOCUMENTS

DE  102009025094 A1  12/2010
JP  2002-188657 A  7/2002
(Continued)

OTHER PUBLICATIONS

International Search Report dated Nov. 17, 2015, issued in counterpart International Application No. PCT/JP2015/074193 (2 pages).

*Primary Examiner* — Bryan A Evans
(74) *Attorney, Agent, or Firm* — Westerman, Hattori, Daniels & Adrian, LLP

(57) ABSTRACT

A hybrid drive apparatus is provided to allow setting a variety of driving modes while achieving improvement in transmission efficiency. The hybrid drive apparatus includes an engine, first and second motor generators and a planetary gear mechanism. An output shaft of the first motor generator, an output shaft of an engine and an output shaft of the second motor generator, and an input shaft of the continuously variable transmission mechanism are coupled respectively to a sun gear, ring gear and carrier of the planetary gear mechanism. The hybrid drive apparatus includes first, second and third clutches which can switch engagement/disengagement respectively between the output shaft of the engine and the ring gear, between the carrier and the ring
(Continued)

gear, and on the input shaft of the continuously variable transmission mechanism.

8 Claims, 6 Drawing Sheets

(51) Int. Cl.
*B60K 6/24* (2007.10)
*B60K 6/26* (2007.10)
*B60K 6/387* (2007.10)
*B60K 6/40* (2007.10)
*B60K 6/445* (2007.10)
*B60K 6/543* (2007.10)
*B60K 6/36* (2007.10)
*B60K 6/48* (2007.10)
*B60W 20/20* (2016.01)
*B60W 20/40* (2016.01)
*F16H 37/04* (2006.01)
*F16H 9/12* (2006.01)
*F16H 3/72* (2006.01)

(52) U.S. Cl.
CPC ............... *B60K 6/387* (2013.01); *B60K 6/40* (2013.01); *B60K 6/445* (2013.01); *B60K 6/48* (2013.01); *B60K 6/543* (2013.01); *B60L 50/16* (2019.02); *B60W 20/20* (2013.01); *B60W 20/40* (2013.01); *F16H 37/042* (2013.01); *F16H 3/728* (2013.01); *F16H 9/12* (2013.01)

(56) References Cited

U.S. PATENT DOCUMENTS

| | | |
|---|---|---|
| 2008/0182694 A1 | 7/2008 | Holmes |
| 2011/0143874 A1 | 6/2011 | Tangl |
| 2013/0035188 A1* | 2/2013 | Yagasaki ............... B60K 6/365 475/5 |
| 2014/0051537 A1* | 2/2014 | Liu ......................... F16H 3/72 475/5 |

FOREIGN PATENT DOCUMENTS

| | | |
|---|---|---|
| JP | 2009-107426 A | 5/2009 |
| JP | 2013-32119 A | 2/2013 |
| JP | 2013-141958 A | 7/2013 |

\* cited by examiner

| RANGE | MODE | ENGAGING ELEMENT | | | MOT1 OPERATION | MOT2 OPERATION |
|---|---|---|---|---|---|---|
| | | C1 | C2 | C3 | | |
| S, D | MOTOR DRIVING MODE (FORWARD DECELERATION) | × | × | ● | MOT (NORMAL ROTATION) | ON |
| | MOTOR DRIVING MODE (FORWARD DIRECT COUPLING) | × | ● | ● | MOT (NORMAL ROTATION) | OFF |
| | PARALLEL HV MODE (DIRECT COUPLING MODE) | ● | ● | ● | MOT/GEN | OFF |
| | POWER SPLIT MODE | ● | × | ● | MOT (NORMAL ROTATION AT START)/GEN (REVERSE ROTATION AT STOP) | ON |
| | ENGINE DRIVING MODE | ● | ● | ● | INOPERATIVE (OFF) | OFF |
| | REGENERATIVE BRAKE MODE | × | ● | ● | GEN | OFF |
| N, P | NEUTRAL | × | × | × | | OFF |
| | CHARGE/ENGINE START | ● | ● | × | GEN/MOT | OFF |
| R | MOTOR DRIVING MODE (BACKWARD) | × | × | ● | MOT (REVERSE ROTATION) | ON |

FIG.3

HYBRID DRIVE APPARATUS

TECHNICAL FIELD

The present invention relates to a hybrid drive apparatus including an engine that generates power by combustion of fuel, and a motor generator that functions as an electric motor and a generator.

BACKGROUND ART

In the related art, as set forth in, for example, Patent Document 1, there is a hybrid drive apparatus for a vehicle which includes an engine that generates power by fuel combustion, a motor generator that functions as an electric motor and a generator, a planetary gear mechanism that is capable of combining and then outputting driving forces input from the engine and the motor generator, and a transmission mechanism that is capable of outputting a rotation caused by a driving force from the planetary gear mechanism to the drive wheels while changing the speed of the rotation. In the hybrid drive apparatus disclosed in Patent Document 1, an output shaft of the motor generator, an output shaft of the engine and an input shaft of the continuously variable transmission mechanism are coupled respectively to a sun gear, ring gear and carrier of the planetary gear mechanism 30. Further, the hybrid drive apparatus includes a first clutch that can switch engagement/disengagement between the output shaft of the engine and the ring gear and a second clutch C2 that can switch engagement/disengagement between the carrier and the ring gear.

In the hybrid drive apparatus disclosed in Patent Document 1, the second clutch is provided between the ring gear and carrier of the planetary gear mechanism whose relative velocity is comparatively large. As a result, the differential rotation (slipping velocity) of the friction material becomes small when the second clutch is in a disengaged state. Thus, friction loss in the second clutch can be reduced, thereby achieving a corresponding improvement in the transmission efficiency of the hybrid drive apparatus.

However, in the hybrid drive apparatus disclosed in Patent Document 1, a rotation occurs to the ring gear of the planetary gear mechanism when the first and second clutches are in engagement. Consequently, a differential rotation (slipping velocity) occurs to the friction material of the brake provided between the ring gear and a fixing member such as a casing. Still, as far as in the hybrid drive apparatus disclosed in Patent Document 1, the brake is provided for fixing the ring gear to the fixing member, the differential rotation (slipping velocity) occurring to the brake cannot be fundamentally eliminated, causing a loss due to the differential rotation to the brake. In particular, the differential rotation occurring when the first and second clutches are in engagement causes a loss. Therefore, by reconsidering the hybrid drive apparatus disclosed in Patent Document 1 provided with the brake for fixing the ring gear of the planetary gear mechanism to the fixing member such as the casing, a hybrid drive apparatus with reduced loss may be established to achieve improvement in the transmission efficiency of the hybrid drive apparatus.

Further, in the hybrid drive apparatus disclosed in Patent Document 1, at the time of starting by driving forces of the motor (motor generator), the vehicle starts using a range in which the rotation speed of the motor rises from zero. However, in general, the motor efficiency is better in a range different from the range in which the rotation speed rises from zero. Therefore, by improving the configuration of the hybrid drive apparatus disclosed in Patent Document 1, the efficiency in the driving mode using the driving forces of the motor can further increase.

RELATED ART DOCUMENTS

Patent Documents

[Patent Document 1] Japanese Unexamined Patent Application Publication No. 2013-32119

DISCLOSURE OF THE INVENTION

Problems to be Solved by the Invention

The present invention was made in view of above-mentioned point, and the purpose is to provide a hybrid drive apparatus that can improve the power transmission loss generated to the brake provided between the ring gear of the planetary gear mechanism and the fixing member, and further to enhance the efficiency in the driving mode using the driving force of the motor.

Means of Solving the Problems

In order to solve the above-mentioned problems, a hybrid drive apparatus according to the present invention includes an engine (10) that generates power by combustion of fuel, first and second motor generators (20-1, 20-2) that function as an electric motor and a generator, a planetary gear mechanism (30) that has three components, namely, a sun gear (S), a ring gear (R) and a carrier (C), and a continuously variable transmission mechanism (40) that can output a rotation input from either a first rotating shaft (42) coupled to the planetary gear mechanism (30) or a second rotating shaft (44) that connects to drive wheels (60, 60) to the other thereof while changing the speed of the rotation. In the planetary clear mechanism (30), a rotating shaft (21-1) of the first motor generator (20-1) is coupled to the sun gear (S), a rotating shaft (21-2) of the second motor generator (20-2) and an output shaft (11) of the engine (10) are coupled to the ring gear (R), and the first rotating shaft (42) of the transmission mechanism (40) is coupled to the carrier (C). The hybrid drive apparatus includes a first clutch (C1) that can switch engagement/disengagement between the output shaft (11) of the engine (10) and the ring gear (R), and a second clutch (C2) that can switch engagement/disengagement between the carrier (C) and the ring gear (R).

Moreover, the hybrid drive apparatus according to this invention includes an engine (10) that generates power by combustion of fuel, first and second motor generators (20-1, 20-2) that function as an electric motor and a generator, a planetary gear mechanism (30) that has three components, namely, a sun gear (5), a ring gear (R) and a carrier (C), and a continuously variable transmission mechanism (40) that outputs a rotation input from either an first input rotating shaft (42) coupled to the planetary gear mechanism (30) or a second rotating shaft (44) that connects to drive wheels (60, 60) to the other thereof while changing the speed of the rotation. In the planetary gear mechanism (30), a rotating shaft (21-1) of the first motor generator (20-1) is coupled to the sun gear (S), a rotating shaft (21-2) of the second motor generator (20-2) and an output shaft (11) of the engine (10) are coupled to the ring gear (R), and the first rotating shaft (42) of the transmission mechanism (40) is coupled to the carrier (C). The hybrid drive apparatus includes a first clutch (C1) that can switch engagement/disengagement between the output shaft (11) of the engine (10) and the ring gear (R) of the planetary gear mechanism (30), and a second clutch (C2) that can switch engagement/disengagement between the carrier (C) and sun gear (S) of the planetary gear mechanism (30).

The hybrid drive apparatus in accordance with the present invention includes the second motor generator in addition to the first motor generator both of which function as an electric motor and a generator. The rotating shaft of the first motor generator, the rotating shaft of the second motor generator and the output shaft of the engine, and the first rotating shaft of the transmission mechanism are coupled respectively to the sun gear, ring gear and carrier of the planetary gear mechanism. In addition, a configuration is adopted such that the first clutch is provided between the output shaft of the engine and the ring gear, and the second clutch is provided between the carrier and the sun gear. Thus, compared with the hybrid drive apparatus having the conventional configuration disclosed in Patent Document 1, a configuration is established such that the brake provided between the ring gear and the fixing member such as the casing is omitted. Therefore, the differential rotation (slipping velocity) generated to the brake can be fundamentally eliminated. Therefore, a loss due to the differential rotation (slipping velocity) generated to the brake when the first and second clutches are in engagement can be eliminated, thereby achieving improvement in the transmission efficiency of the hybrid drive apparatus.

Moreover, according to the hybrid drive apparatus in accordance with the present invention, the configuration is adopted such that the rotating shaft of the second motor generator is coupled to the ring gear of the planetary gear mechanism, thereby enabling the ring gear to be constantly rotatable. On the contrary, the conventional hybrid drive apparatus with the configuration allowing the ring gear to be fixed by the brake causes the vehicle (equipped with the hybrid drive apparatus) to start by driving forces of the motor generator using the range in which the rotation speed of the motor generator increases from zero. On the other hand, the above-described configuration of the present invention enables a vehicle equipped with the hybrid drive apparatus to start using a high-efficiency rotation range of the first and second generators, thereby achieving improvement in the transmission efficiency at the time of start.

The above-mentioned hybrid drive apparatus according to the present invention may further include a third clutch (C3, C3') that can switch engagement/disengagement on the first rotating shaft (42) or the second rotating shaft (44). According to this configuration, the power transmitted from the planetary gear mechanism to the drive wheels can be cut off by disengaging the third clutch. Therefore, in the disengaged state of the third clutch, the driving forces of the engine are used to generate electricity by the motor generator and thus charge a storage battery.

Also, in the hybrid drive apparatus according to the present invention, the transmission mechanism (40) may be a belt-type continuously variable transmission mechanism (40) including a driving pulley (41) that connects to the first rotating shaft (42), a driven pulley (43) that connects to the second rotating shaft (44), and a belt (48) that is run between the driving pulley (41) and the driven pulley (43).

In that case, the third clutch (C3) may be provided on the first rotating shaft (42) of the transmission mechanism (40). According to this configuration, the driving force (input torque) input to the belt-type continuously variable transmission mechanism from the planetary gear mechanism can be limited by disengaging the third clutch. This can secure functions such as slip security of the belt type continuously variable transmission mechanism without any complicated control or estimation of torque input to the belt type continuously variable transmission mechanism.

Alternatively, the third clutch (C3) may be provided on the second rotating shaft (44) of the transmission mechanism (40). According to this configuration, transmission of power from the continuously variable transmission mechanism to the drive wheels can be cut off by disengaging the third clutch, while keeping the continuously variable transmission mechanism rotated by the power transmitted from the planetary gear mechanism. As a result, the continuously variable transmission mechanism has no need to be controlled on the condition that the ratio (pulley ratio) of the continuously variable transmission mechanism at the time of cutting off transmission of power to the drive wheels can be returned to the ratio used at the time of resuming transmission of power to the drive wheels next time. That is, the ratio of the continuously variable transmission mechanism can be changed even while transmission of power to the drive wheels is cut off by disengaging the third clutch. Thus, even if the ratio at the time of resuming transmission of power to the drive wheels next time is a low speed ratio for hillclimbing driving or decelerating regeneration, the ratio of the continuously variable transmission mechanism prior to cutting off transmission of power to the drive wheels can be set to an optimum ratio for the driving condition at that time. This allows regeneration of decelerating energy or the like without affecting the drivability of the vehicle.

Also, it is unnecessary to supplement torque during low speed driving by the motor generator in order to return the ratio of the continuously variable transmission mechanism to a low speed ratio when resuming transmission of power to the drive wheels next time. Therefore, there is no need to secure spare capacity in the output of the motor generator in consideration of the need to supplement torque, thereby achieving the motor generator with lower power and smaller size. It is to be noted that the above symbols in parentheses each represent a symbol denoting the corresponding component in embodiments described later, as an example of the present invention.

Effects of the Invention

The hybrid drive apparatus according to the present invention can improve the power transmission loss generated to the brake provided between the ring gear of the planetary gear mechanism and the fixing member, and further enhance the efficiency in the driving mode using the driving force of the motor.

BRIEF DESCRIPTION OF THE DRAWINGS

FIG. 3 is a chart (table) for explaining the relationship among driving modes of the hybrid drive apparatus and operating states of clutches and a brake;

Embodiments of the present invention will be described in detail as below with reference to the accompanying drawings.

FIRST EMBODIMENT

Figure 1:
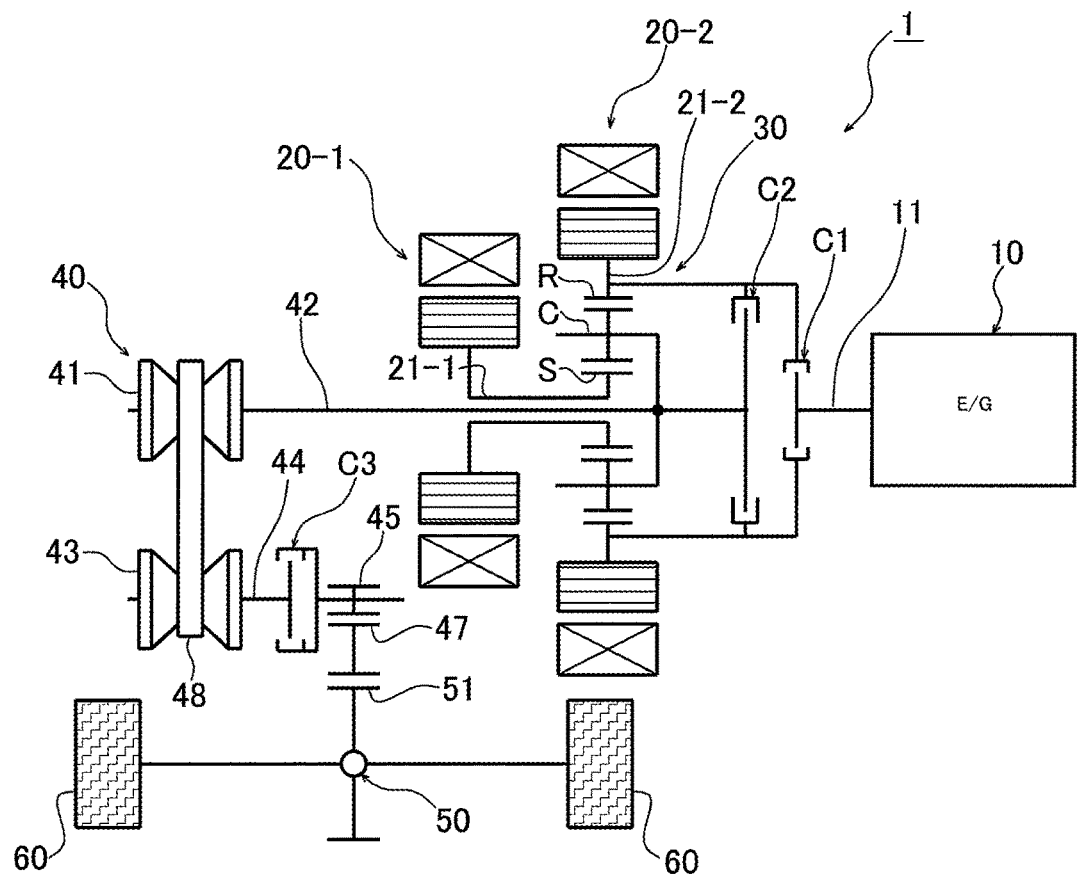
FIG. 1 is a skeleton diagram illustrating the configuration of a hybrid drive apparatus according to a first embodiment of the invention.
Figure 2:
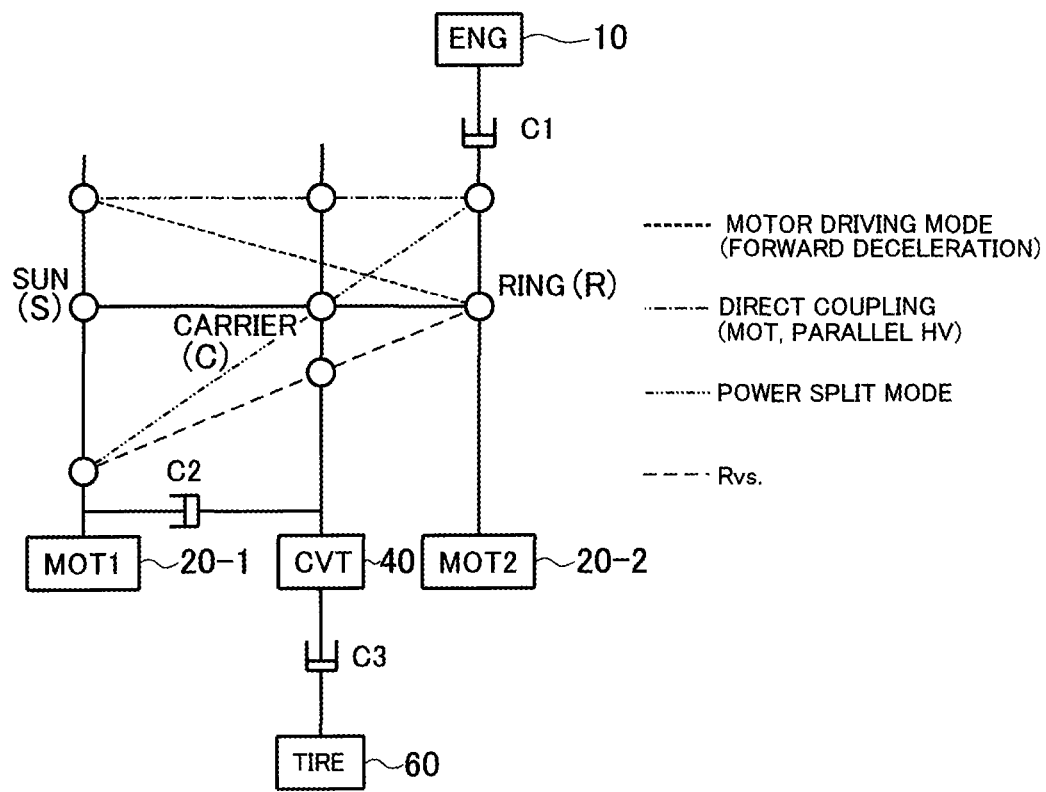
FIG. 2 is a nomographic diagram illustrating the velocity relationship among various components of a planetary gear mechanism.
Figure 4A:
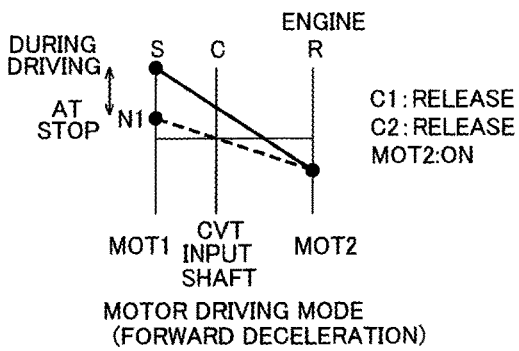
FIGS. 4A to 4H are nomographic diagrams illustrating the velocity relationship among various components of the planetary gear mechanism in each driving mode.
Figure 4B:
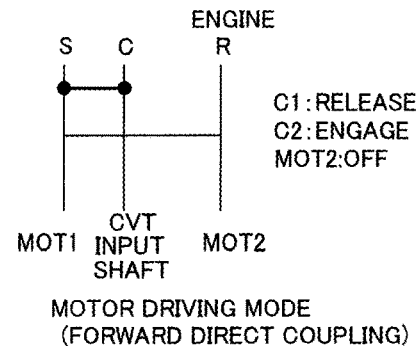
Figure 4C:
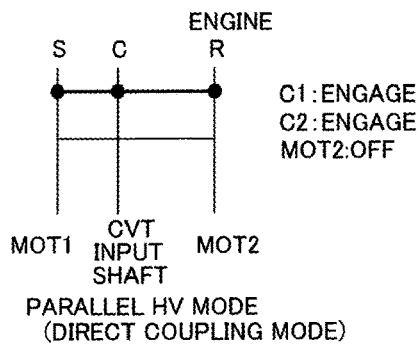
Figure 4D:
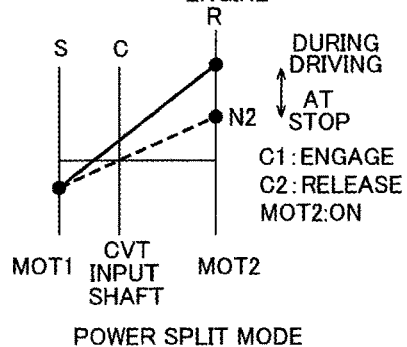
Figure 4E:
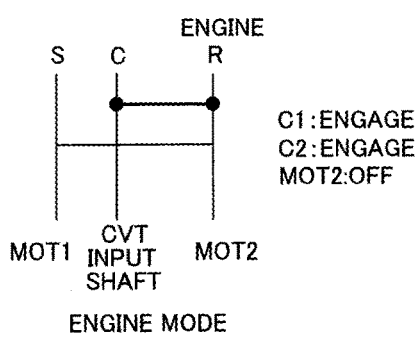
Figure 4F:
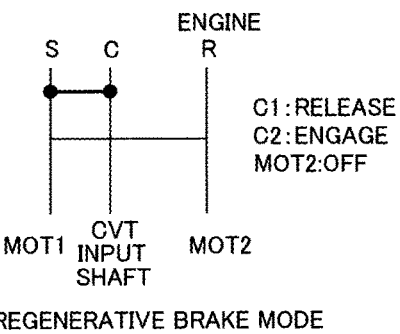
Figure 4G:
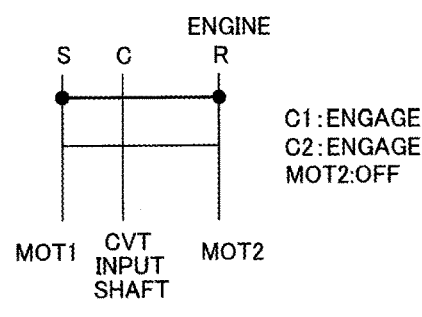
Figure 4H:
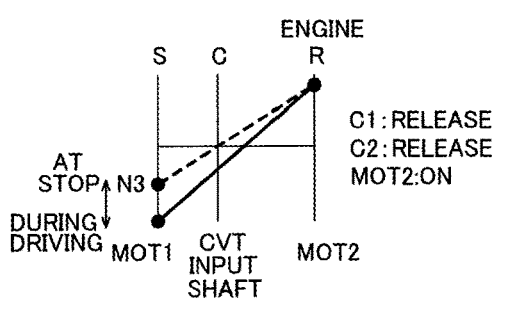

FIG. 1 is a skeleton diagram illustrating the configuration of a hybrid drive apparatus according to a first embodiment of the invention. Also, FIG. 2 is a nomographic diagram (velocity diagram) illustrating the velocity relationship among various components of a planetary gear mechanism provided in the hybrid drive apparatus. A hybrid drive apparatus 1 illustrated in FIG. 1 includes an engine 10 that generates power by combustion of fuel, a first and second motor generators (MOT1, MOT2) 20-1, 20-2 that function as an electric motor and a generator, a single pinion-type planetary gear mechanism 30 having three components, namely, a sun gear S, a ring gear R and a carrier C, and a belt-type continuously variable transmission mechanism 40 having a belt 48 that is run between a driving pulley 41 and a driven pulley 43.

An output shaft (rotating shaft) 21-1 of the first motor generator 20-1 is coupled to the sun gear S of the planetary gear mechanism 30. An input shaft (first rotating shaft) 42 that connects to the driving pulley 41 of the continuously variable transmission mechanism 40 is coupled to the carrier C of the planetary gear mechanism 30. The ring gear R is coupled to the output shaft 11 of the engine 10 via the first clutch C1; and also coupled to the input shaft 42 of the continuously variable transmission mechanism 40 via a second clutch C2. The ring gear R is also coupled to the output shaft (rotating shaft) 21-2 of the second motor generator (MOT2) 20-2.

Further, an output gear 45 meshing with a counter gear 47 is provided on an output shaft (second rotating shaft) 44 which connects to the driven pulley 43 of the continuously variable transmission mechanism 40. The counter gear 47 is meshed with a ring gear 51 of a differential 50. The differential 50 is configured to distribute the driving force from the counter gear 47 to left and right drive wheels 60, 60. A third clutch C3 is provided on the output shaft 44 (between the driven pulley 43 and the output gear 45) of the continuously variable transmission mechanism 40.

That is, in the planetary gear mechanism 30 of the hybrid drive apparatus 1 illustrated in FIG. 1, the sun gear S coupled to the output shaft 21 of the first motor generator 20-1, and the ring gear R coupled to the output shaft 11 of the engine 10 and the output shaft 21-2 of the second motor generator 20-2 each serve as an input member, and the carrier C coupled to the input shaft 42 of the continuously variable transmission mechanism 40 serves as an output member. The first clutch C1 can switch engagement/disengagement between the output shaft 11 of the engine 10 and the ring gear R, and the second clutch C2 can switch engagement/disengagement between the carrier C and the ring gear R. Also, the third clutch C3 can switch whether or not to transmit driving forces from the continuously variable transmission mechanism 40 to the drive wheels 60, 60. Although not illustrated in detail, a single disc or multi-disc hydraulic friction clutch that is frictionally engaged by means of a hydraulic actuator may be used for each of the first to third clutches C1 to C3. Other kinds of clutches such as an electromagnetic clutch may be used as well.

FIG. 3 is a chart (table) illustrating the relationship among driving modes of the hybrid drive apparatus 1 illustrated in FIG. 1, operating states of the first to third clutches C1 to C3, and operating states of the first and second motor generators (MOT1, MOT2) 20-1, 20-2. FIGS. 4A to 4H are nomographic diagrams (velocity diagrams) illustrating the velocity relationship among various components of the planetary gear mechanism 30 in each driving mode of the hybrid drive apparatus 1. In FIG. 3, the mark "●" indicates engaged state of the corresponding each clutch, and the mark "x" indicates disengaged (released) state. In the hybrid drive apparatus 1, the driving modes illustrated in the table of FIG. 3 are established in accordance with the operating states (engaged/disengaged) of the first to third clutches C1 to C3 and the operating states of the first and second motor generators (MOT1, MOT2) 20-1, 20-2. That is, when the transmission range is "S" or "D", one of the following modes is established: "motor driving mode (forward deceleration)"; "motor driving mode (forward direct coupling)"; "parallel HV mode (direct coupling mode)"; "power split mode"; "engine driving mode"; and "regenerative brake mode". When the transmission range is "N" or "P", either "neutral" or "charge/engine start mode" is established. When the transmission range is "R", "motor driving mode (backward)" is established. For the "S", "D", and "R" ranges, the third clutch C3 is engaged in all of these modes. For the "N" and "P" ranges, the third clutch C3 is disengaged (released) in all of these modes. The driving modes are described in detail below.

In the "motor driving mode (forward deceleration)", the second motor generator (MOT2) 20-2 is ON (rotated), the first and second clutches C1, C2 are released, and in this state, the first motor generator 20-1 is driven to rotate in the normal direction. As a result, the combined driving force of the first and second motor generators 20-1, 2-2 is transmitted to the drive wheels 60, 60 via the planetary gear mechanism 30 and the continuously variable transmission mechanism 40, thereby driving the vehicle forward by the driving force of the first and second motor generators 20-1, 20-2. And in this "motor driving mode (forward deceleration)", as illustrated in the nomographic diagram of FIG. 4A, the rotation of the output shaft 21-1 of the first motor generator 20-1 input to the sun gear S is reduced to be output from the carrier C to the continuously variable transmission mechanism 40. In this way, in the hybrid drive apparatus 1 according to this embodiment, the rotation of the output shaft 21-1 of the first motor generator 20-1 is reduced by means of the planetary gear mechanism 30 before being output. Therefore, in the "motor driving mode (forward deceleration)", a large torque can be attained particularly during vehicle starting, without increasing the size of the first motor generator 20-1.

Moreover, in this "motor driving mode (forward deceleration)", the rotation speed of the carrier C becomes 0 at a predetermined rotation speed N1 (N1>0) of the first motor generator 20-1. As the rotation speed of the first motor generator 20-1 is raised therefrom, the rotation speed of the carrier C rises gradually. Thus, the raise in the rotation speed of the first motor generator 20-1 from the predetermined rotation speed N1 enables the vehicle to start. This allows the vehicle to start by the driving force of the first and second motor generators 20-1, 20-2, without using the range where the rotation speed of the first or second motor generator 20-1, 20-2 rises from 0, thereby enabling the vehicle to start using a high-efficiency rotation range of the first and second motor generators 20-1, 20-2.

In the "motor driving mode (forward direct coupling)", the second clutch C2 is engaged, the first clutch C1 is released, and the second motor generator 20-2 is OFF (at a stop), and in this state, the first motor generator 20-1 is driven to rotate in the normal direction. As a result, the driving force of the first motor generator 20-1 is transmitted to the drive wheels 60, 60 via the planetary gear mechanism 30 and the continuously variable transmission mechanism 40, thereby driving the vehicle forward by the driving force of the first motor generator 20-1 alone. In this "motor driving mode (forward direct coupling)", the engagement of the second clutch C2 causes the three components of the planetary gear mechanism 30, namely, the ring gear R, the carrier C and the sun gear S to rotate integrally. Therefore, as illustrated in the velocity diagram of FIG. 4B, the rotation of the output shaft 21-1 of the first motor generator 20-1 input to the sun gear S is output from the carrier C to the continuously variable transmission mechanism 40 while remaining at the same velocity. In this way, in the hybrid drive apparatus 1 according to this embodiment, the engagement of the second clutch C2 causes the components of the planetary gear mechanism 30, namely, the ring gear R, the carrier C and the sun gear S to rotate integrally. Therefore, in the "motor driving mode (forward direct coupling)", a large amount of energy can be efficiently regenerated during decelerating regeneration by the first motor generator 20-1.

In the "parallel HV mode (direct coupling mode)", the first and second clutches C1, C2 are engaged, the second motor generator 20-2 is OFF (at a stop), and in this state, the first motor generator 20-1 is operated as an electric motor or a generator. In this "parallel HV mode (direct coupling mode)", as illustrated in the nomographic diagram of FIG. 4C, the engagement of the second clutch C2 causes the three components of the planetary gear mechanism 30, namely, the ring gear R, the carrier C and the sun gear S to rotate integrally. In the case of operating the first motor generator 20-1 as an electric motor, the first motor generator 20-1 is driven to rotate in the normal direction, which causes the driving force of the first motor generator 20-1 and the driving force of the engine 10 which are combined in the planetary gear mechanism 30 to be transmitted to the drive wheels 60, 60 via the continuously variable transmission mechanism 40, thereby driving the vehicle forward. In the case of operating the first motor generator 20-1 as a generator, on the other hand, as the rotation of the output shaft 11 of the engine 10 input to the ring gear R is output from the carrier C to the continuously variable transmission mechanism 40 while remaining at the same velocity, the vehicle drives forward, and the driving force transmitted to the output shaft 21-1 of the first motor generator 20-1 at that time from the sun gear S that rotates integrally with the ring gear R is used to generate electricity by the first motor generator 20-1.

In the "power split mode", the first clutch C1 is engaged, the second clutch C2 is released, and in the state of the second motor generator 20-2 being ON (rotating), the first motor generator 20-1 is driven to rotate in the reverse direction. As a result, the driving force of the first motor generator 20-1 and the driving force of the engine 10 which are combined in the planetary gear mechanism 30 and the driving force of the second motor generator 20-2 are transmitted to the drive wheels 60, 60 via the continuously variable transmission mechanism 40, thereby driving the vehicle forward by both the driving force of the motor generator 20 and the engine 10 and the driving force of the second motor generator 20-2. In this "power split mode", as illustrated in the nomographic diagram of FIG. 4D, a rotation that is reduced relative to the rotation of the output shaft 11 of the engine 10 and the rotation of the output shaft 21-2 of the second motor generator 20-2 is output from the carrier C to the continuously variable transmission mechanism 40. In other words, in the state indicated by the dotted nomographic line in FIG. 4D, the ring gear R coupled to the output shaft 11 of the engine 10 and the output shaft 21-2 of the second motor generator 20-2 is rotating at a rotation speed of N2 (N2>0) in the normal direction, the rotation speed of the carrier C coupled to the input shaft 42 of the continuously variable transmission mechanism 40 is zero, and the vehicle is at a stop. At this time, the sun gear S coupled to the first motor generator 20-1 is being driven to rotate in the reverse direction, and the first motor generator 20-1 is generating electricity. When the second motor generator 2-2 is controlled and the rotation speed thereof is raised from this state, the rotation speed of the ring gear R gradually rises, as indicated by the solid nomographic line, from the rotation speed N2, whereby the rotation speed of the carrier gradually rises from 0.

This allows the vehicle to start smoothly from zero speed even without a starting device.

In this manner, the vehicle can start by the driving force of the first and second motor generators 20-1, 20-2, without using the range where the rotation speed of the first or second motor generator 20-1, 20-2 rises from 0, thereby enabling the vehicle to start using a high-efficiency rotation range of the first and second motor generators 20-1, 20-2.

In the "engine driving mode", the first and second clutches C1, C2 are engaged, the second motor generator 20-2 is OFF (at a stop), and in this state, the first motor generator 20-1 is rendered non-operative. As a result, the driving force of the engine 10 is transmitted to the drive wheels 60, 60 via the planetary gear mechanism 30 and the continuously variable transmission mechanism 40, thereby driving the vehicle forward by the driving force of the engine 10 alone. In this "engine driving mode", the engagement of the second clutch C2 causes the three components of the planetary gear mechanism 30, namely, the ring gear R, the carrier C and the sun gear S to rotate integrally. Therefore, as illustrated in the nomographic diagram of FIG. 4E, the rotation of the output shaft 11 of the engine 10 input to the ring gear R is output from the carrier C to the continuously variable transmission mechanism 40 while remaining at the same velocity. In the hybrid drive apparatus 1 according to this embodiment, the engagement of the second clutch C2 causes the components of the planetary gear mechanism 30, namely, the ring gear R, the carrier C and the sun gear S to rotate integrally. Therefore, this "engine driving mode" enables efficient transmission of the output of the engine 10.

In the "regenerative brake mode", the second clutch C2 is engaged, the first clutch C1 is released, the second motor generator 20-2 is OFF (at a stop), and in this state, the first motor generator 20-1 is operated as a generator, thereby performing regenerative braking by the first motor generator 20-1. In this "regenerative brake mode" as well, the engagement of the second clutch C2 causes the three components of the planetary gear mechanism 30, namely, the ring gear R, the carrier C and the sun gear S to rotate integrally. Therefore, as illustrated in the nomographic diagram of FIG. 4F, the rotation of the input shaft 42 of the continuously variable transmission mechanism 40 input to the carrier C is output from the sun gear S to the output shaft 21-1 of the first motor generator 20-1 while remaining at the same velocity. In this hybrid drive apparatus 1 according to this embodiment, the power transmission path through which the driving force from the engine 10 is transmitted can be separated by means of the first clutch C1 from the power transmission path between the first motor generator 20-1 and the drive wheels 60, 60. This allows to eliminate drag torque of the engine 10 input to the planetary gear mechanism 30 during decelerating regeneration, thereby performing efficient regeneration of energy by the first motor generator 20-1.

In "neutral", the third clutch C3 is released as described above, and further, the first and second clutches C1 and C2 are released, and the second motor generator 20-2 is OFF (at a stop). As a result, the power transmission path between the output shaft 11 of the engine 10 and the planetary gear mechanism 30, the power transmission path between the output shaft 11 of the engine 10 and the input shaft 42 of the continuously variable transmission mechanism 40, and the power transmission path from the continuously variable transmission mechanism 40 to the drive wheels 60, 60 become cut off.

In the "charge/engine start mode", the third clutch C3 is released, and further, the first and second clutches C1, C2 are engaged, and the second motor generator 20-2 is OFF (at a stop). In this state, the first motor generator 20-1 is operated as an electric motor to start the engine 10, or the first motor generator 20-1 is operated as a generator to perform electricity generation (charging) by the driving force of the engine 10. To start the engine 10, the rotation of the output shaft 21-1 of the first motor generator 20-1 is transmitted to the output shaft 11 of the engine 10 by the planetary gear mechanism 30. Also, to generate electricity by the first motor generator 20-1, the rotation of the output shaft 11 of the engine 10 is transmitted to the output shaft 21-1 of the first motor generator 20-1 by the planetary gear mechanism 30 to rotationally drive the first motor generator 20-1, thereby generating electricity to charge a capacitor (not illustrated) connected to the first motor generator 20-1. In this "charge/engine start mode", the engagement of the second clutch C2 causes the three components of the planetary gear mechanism 30, namely, the ring gear R, the carrier C and the sun gear S to rotate integrally. Therefore, as illustrated in the nomographic diagram of FIG. 4G, a rotation input to one of these components, namely, the sun gear S, the carrier C and the ring gear R is output to either of the other two components while remaining at the same velocity.

In the hybrid drive apparatus 1 according to this embodiment, the third clutch C3 is provided on the output shaft 44 of the continuously variable transmission mechanism 40. Thus, by disengaging the third clutch C3, the power transmitted from the continuously variable transmission mechanism 40 to the drive wheels 60, 60 can be cut off. Therefore, in the disengaged state of the third clutch C3 as described above, the driving force of the engine 10 is used to generate electricity by the first motor generator 20-1 and thus charge a storage battery.

In the "motor driving mode (backward)", the second motor generator (MOT2) 20-2 is ON (rotated), the first and second clutches C1, C2 are released, and in this state, the first motor generator 20-1 is driven to rotate in the reverse direction. As a result, the vehicle is driven backward by the driving force of first motor generator 20-1. And, in this "motor driving mode (backward)", as illustrated in the nomographic diagram of FIG. 4H, the rotation (reverse rotation) of the output shaft 21-1 of the first motor generator 20-1 input to the sun gear S is reduced to be output from the carrier C to the continuously variable transmission mechanism 40.

Moreover, in this "motor driving mode (backward)", the rotation speed of the carrier C becomes 0 at a predetermined rotation speed N3 (N3>0) of the first motor generator 20-1. When the rotation speed (of the reverse drive) of the first motor generator 20-1 is raised therefrom, the rotation speed (of the reverse drive) of the carrier C rises gradually. Thus, the raise in the rotation speed of the first motor generator 20-1 from the predetermined rotation speed N3 enables the vehicle to start (backward).

In this manner, the vehicle can start backward by the driving force of the first and second motor generators 20-1, 20-2, without using the range where the rotation speed of the first or second motor generator 20-1, 20-2 rises from 0, thereby enabling the vehicle to start using a high-efficiency rotation range of the first and second motor generators 20-1, 20-2.

As described above, the hybrid drive apparatus 1 according to this embodiment includes the engine 10 that generates power by combustion of fuel, the first and second motor generators 20-1, 20-2 that function as an electric motor and a generator, the planetary gear mechanism 30 that has three components, namely, the sun gear S, the ring gear R and the carrier C, and the continuously variable transmission mechanism 40 that can output a rotation caused by the driving force from the planetary gear mechanism 30 to the drive wheels 60, 60 while changing the speed of the rotation. The output shaft 21-1 of the first motor generator 20-1, the output shaft 11 of the engine 10 and the output shaft 20-2 of the second motor generator 20-2, and the input shaft 42 of the continuously variable transmission mechanism 40 are coupled respectively to the sun gear S, ring gear R and carrier C of the planetary gear mechanism 30. Further, the hybrid drive apparatus 1 according to this embodiment includes the first clutch C1 that can switch engagement/disengagement between the output shaft 11 of the engine 10 and the ring gear R, the second clutch C2 that can switch engagement/disengagement between the carrier C and the ring gear R, and the third clutch C3 that is provided on the output shaft 44 of the continuously variable transmission mechanism 40.

The hybrid drive apparatus 1 according to this embodiment includes the second motor generator 20-2 in addition to the first motor generator 20-1 that functions an electric motor and a generator. The output shaft (rotating shaft) 21-1 of the first motor generator 20-1, the output shaft (rotating shaft) 21-2 of the second motor generator 20-1 and the output shaft 11 of the engine 10, and the input shaft 42 of the continuously variable transmission mechanism 40 are coupled to the sun gear S, ring gear R and carrier C of the planetary gear mechanism 30. In addition, a configuration is adopted such that the first clutch C1 is provided between the output shaft 11 of the engine 10 and the ring gear R, and the second clutch C2 is provided between the carrier C and the sun gear S. Thus, compared with the hybrid drive apparatus having the conventional configuration disclosed in Patent Document 1, a configuration is established such that the brake provided between the ring gear and the fixing member such as the casing is omitted. Therefore, the differential rotation (slipping velocity) generated to the brake can be fundamentally eliminated. Thus, a loss due to the differential rotation (slipping velocity) generated to the brake when the first and second clutches are in engagement can be eliminated, thereby achieving improvement in the transmission efficiency of the hybrid drive apparatus.

Moreover, according to the hybrid drive apparatus 1 in accordance with the present invention, the configuration is adopted such that the rotating shaft 21-2 of the second motor generator 20-2 is coupled to the ring gear R of the planetary gear mechanism 30, thereby enabling the ring gear R to be constantly rotatable. On the contrary, the conventional hybrid drive apparatus with the configuration allowing the ring to be fixed by the brake causes the vehicle (equipped with the hybrid drive apparatus) to start by the drive force of the motor generator using the range in which the rotation speed of the motor generator increases from zero. On the other hand, the above-described configuration of the present invention enables the vehicle to start using a high-efficiency rotation range of the first and second motor generators 20-1, 20-2, thereby achieving improvement in the transmission efficiency of the hybrid drive apparatus.

The hybrid drive apparatus 1 according to this embodiment includes the first clutch C1 that can switch engagement/disengagement between the output shaft 11 of the engine 10 and the ring gear R. Thus, an input of driving force from the engine 10 to the planetary gear mechanism 30 can be cut off by means of the first clutch C1. Thus, the power transmission path through which the driving force from the engine 10 is transmitted can be separated from the power transmission path between the first motor generator 20-1 and the drive wheels 60, 60. Therefore, when performing decelerating regeneration using the first motor generator 20-1 during deceleration of the vehicle, the driving force of the engine 10 input to the planetary gear mechanism 30 can be cut off, thereby enabling efficient regeneration of decelerating energy by the first motor generator 20-1.

In the hybrid drive apparatus 1 according to this embodiment, by engaging the second clutch C2 provided between the carrier C and ring gear R of the planetary gear mechanism 30, the three components (the ring gear R, the sun gear S, and the carrier C) of the planetary gear mechanism 30 can rotate integrally. As a result, mechanical power transmission loss in the planetary gear mechanism 30 can be reduced in the planetary gear mechanism 30. Therefore, the power from the engine 10 and the first motor generator 20-1 can be transmitted more efficiently, and also decelerating energy can be regenerated by the first motor generator 20-1 more efficiently.

Also, in the hybrid drive apparatus 1 according to this embodiment, the third clutch C3 is provided on the output shaft 44 of the continuously variable transmission mechanism 40. Thus, by disengaging (releasing) the third clutch C3, the power transmitted from the planetary gear mechanism 30 to the drive wheels 60, 60 can be cut off. Therefore, in the disengaged state of the third clutch C3, the driving force of the engine 10 is used to generate electricity by the first motor generator 20-1 and thus charge a storage battery.

Also, in the hybrid drive apparatus 1 according to this embodiment, the third clutch C3 is provided on the output shaft 44 of the continuously variable transmission mechanism 40. According to this configuration, transmission of power from the continuously variable transmission mechanism 40 to the drive wheels can be cut off by disengaging the third clutch C3, while keeping the continuously variable transmission mechanism 40 rotated by the power transmitted from the planetary gear mechanism 30. As a result, the continuously variable transmission mechanism 40 has no need to be controlled on the condition that the ratio (pulley ratio) of the continuously variable transmission mechanism 40 at the time of cutting off transmission of power to the drive wheels 60, 60 can be returned to the ratio used at the time of resuming transmission of power to the drive wheels next time. That is, the ratio of the continuously variable transmission mechanism 40 can be changed even while transmission of power to the drive wheels 60, 60 is cut off by disengaging the third clutch C3. Thus, even if the ratio at the time of resuming transmission of power to the drive wheels 60, 60 next time is a low speed ratio for hill-climbing driving or decelerating regeneration, the ratio of the continuously variable transmission mechanism 40 prior to cutting off transmission of power to the drive wheels 60, 60 can be set to an optimum ratio for the driving condition at that time. This enables regeneration of decelerating energy or the like without affecting the drivability of the vehicle.

Also, it is unnecessary to supplement torque during low speed driving by the first motor generator 20-1 in order to return the ratio of the continuously variable transmission mechanism 40 to a low speed ratio when resuming transmission of power to the drive wheels 60, 60 next time. Therefore, there is no need to secure spare capacity in the output of the first motor generator 20-1 in consideration of the need to supplement torque, thereby achieving the first motor generator 20-1 with lower power and smaller size.

SECOND EMBODIMENT

Next, a second embodiment of the invention is described. In the description of the second embodiment and the corresponding drawings, component parts that are identical or equivalent to those in the first embodiment are denoted by the same symbols, and a detailed description of those parts is omitted. Also, matters other than those described below are the same as those in the first embodiment.

Figure 5:
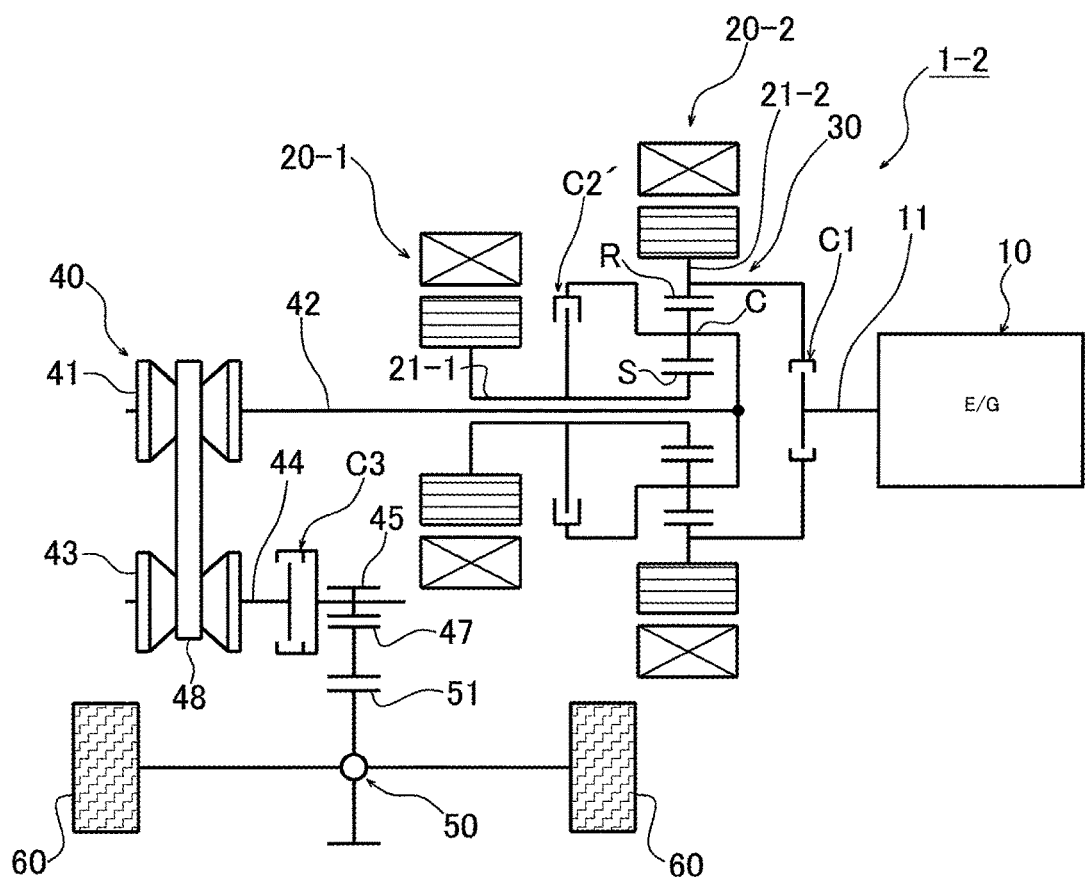
FIG. 5 is a skeleton diagram illustrating the configuration of a hybrid drive apparatus according to a second embodiment of the invention.

FIG. 5 is a skeleton diagram illustrating the configuration of a hybrid drive apparatus 1-2 according to the second embodiment of the invention. The hybrid drive apparatus 1-2 illustrated in FIG. 5 includes, instead of the second clutch C2 provided between the ring gear R and carrier C of the planetary gear mechanism 30 (between the output shaft 11 of the engine 10 and the input shaft 42 of the continuously variable transmission mechanism 40) in the hybrid drive apparatus 1 according to the first embodiment illustrated in FIG. 1, another clutch C2' that is provided between the sun gear S and carrier C of the planetary gear mechanism 30 (between the output shaft 21-1 of the first motor generator 20-1 and the input shaft 42 of the continuously variable transmission mechanism 40). The configuration of this hybrid drive apparatus is otherwise the same as that of the hybrid drive apparatus 1 according to the first embodiment. That is, in the hybrid drive apparatus 1-2 according to this embodiment, the output shaft 21-1 of the first motor generator 20-1, the output shaft 11 of the engine 10 and the input shaft 42 of the continuously variable transmission mechanism 40 are coupled respectively to the sun gear S, ring gear R and carrier C of the planetary gear mechanism 30. Further, the first clutch C1 is provided between the output shaft 11 of the engine 10 and the ring gear R of the planetary gear mechanism 30, the second clutch C2' is provided between the carrier C and sun gear S of the planetary gear mechanism 30, and the third clutch C3 is provided on the output shaft 44 (between the driven pulley 43 and the output gear 45) which connects to the driven pulley 43 of the continuously variable transmission mechanism 40.

THIRD EMBODIMENT

Figure 6:
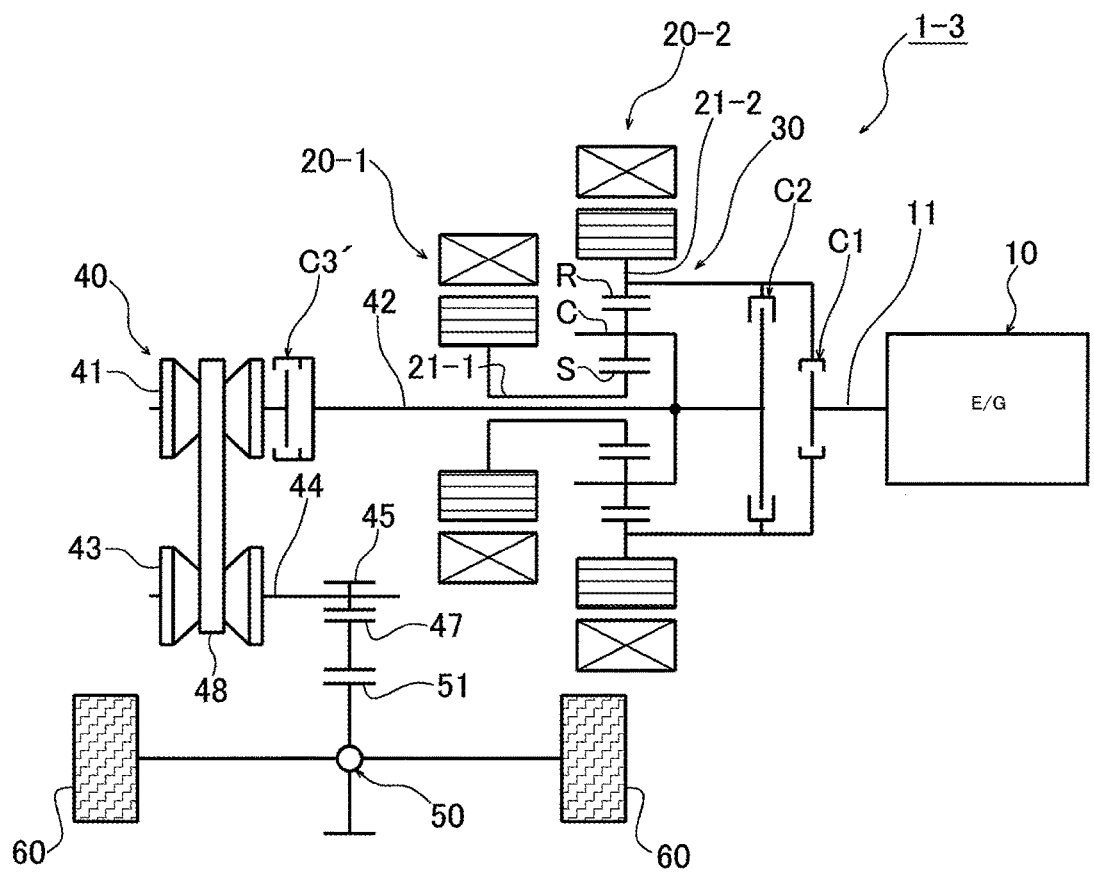
FIG. 6 is a skeleton diagram illustrating the configuration of a hybrid drive apparatus according to a third embodiment of the invention.

Next, a third embodiment of the invention is described. FIG. 6 is a skeleton diagram illustrating the configuration of a hybrid drive apparatus according to the third embodiment of the invention. A hybrid drive apparatus 1-3 according to the third embodiment illustrated in FIG. 6 includes, instead of the third clutch C3 provided on the output shaft (second rotating shaft) 44 which connects to the driven pulley 43 of the continuously variable transmission mechanism 40 in the hybrid drive apparatus 1 according to the first embodiment illustrated in FIG. 1, another third clutch C3' that is provided on the input shaft (first rotating shaft) 42 which connects to the driving pulley 41 of the continuously variable transmission mechanism 40. The configuration of this hybrid drive apparatus is otherwise the same as that of the hybrid drive apparatus 1 according to the first embodiment.

In the hybrid drive apparatus 1-3 according to this embodiment, the third clutch C3' is provided on the input shaft 42 of the continuously variable transmission mechanism 40. Thus, the driving force (input torque) input to the belt-type continuously variable transmission mechanism 40 can be limited by disengaging the third clutch C3'. This can secure functions such as slip security of the belt type continuously variable transmission mechanism 40 without any complicated control or estimation of torque input to the belt type continuously variable transmission mechanism 40.

While embodiments of the invention have been described above, the invention is not limited to the above-mentioned embodiments but various modifications are possible within the scope of the technical idea as defined in the claims, the specification, and the drawings. For example, the transmission mechanism included in the hybrid drive apparatus according to the invention is not limited to the belt-type continuously variable transmission mechanism 40 according to each of the above-mentioned embodiments, but may be a transmission mechanism of another configuration.

The invention claimed is:

1. A hybrid drive apparatus comprising:
an engine generating power by combustion of fuel;
first and second motor generators functioning as an electric motor and a generator;
a planetary gear mechanism having three components of a sun gear, a ring gear and a carrier; and
a transmission mechanism which receives input from a first one of a first rotating shaft coupled to the planetary gear mechanism and a second rotating shaft connecting to drive wheels, the transmission outputting rotation, while changing a speed of rotation, to a second one of the first and second rotating shafts,
wherein a rotating shaft of the first motor generator is coupled to the sun gear of the planetary gear mechanism,
wherein a rotating shaft of the second motor generator and an output shaft of the engine are coupled to the ring gear of the planetary gear mechanism,
wherein the first rotating shaft of the transmission mechanism is coupled to the carrier of the planetary gear mechanism, and
wherein the hybrid drive apparatus comprises:
a first clutch configured to switch engagement/disengagement between the output shaft of the engine and the ring gear of the planetary gear mechanism, and
a second clutch configured to switch engagement/disengagement between the carrier of the planetary gear mechanism and the ring gear thereof.

2. A hybrid drive apparatus comprising:
an engine generating power by combustion of fuel;
a first and second motor generators functioning as an electric motor and a generator;
a planetary gear mechanism having three components of a sun gear, a ring gear and a carrier; and
a transmission mechanism which receives input from a first one of a first rotating shaft coupled to the planetary gear mechanism and a second rotating shaft connecting to drive wheels, the transmission outputting rotation, while changing a speed of rotation, to a second one of the first and second rotating shafts,
wherein a rotating shaft of the first motor generator is coupled to the sun gear of the planetary gear mechanism,
wherein a rotating shaft of the second motor generator and an output shaft of the engine are coupled to the ring gear of the planetary gear mechanism,
wherein the first rotating shaft of the transmission mechanism is coupled to the carrier of the planetary gear mechanism, and
wherein the hybrid drive apparatus comprises:
a first clutch configured to switch engagement/disengagement between the output shaft of the engine and the ring gear of the planetary gear mechanism, and
a second clutch configured to switch engagement/disengagement between the carrier of the planetary gear mechanism and the sun gear thereof.

3. The hybrid drive apparatus according to claim 1, wherein the transmission mechanism further comprises a third clutch configured to switch engagement/disengagement on the first or second rotating shaft.

4. The hybrid drive apparatus according to claim 3, wherein the transmission mechanism is a belt-type continuously variable transmission mechanism comprising:
a driving pulley connecting to the first rotating shaft;
a driven pulley connecting to the second rotating shaft; and
a belt run between the driving pulley and the driven pulley, and
wherein the third clutch is provided on the second rotating shaft of the transmission mechanism.

5. The hybrid drive apparatus according to claim 2, wherein the transmission mechanism further comprises a third clutch configured to switch engagement/disengagement on the first or second rotating shaft.

6. The hybrid drive apparatus according to claim 5, wherein the transmission mechanism is a belt-type continuously variable transmission mechanism comprising:
a driving pulley connecting to the first rotating shaft;
a driven pulley connecting to the second rotating shaft; and
a belt run between the driving pulley and the driven pulley, and
wherein the third clutch is provided on the second rotating shaft of the transmission mechanism.

7. The hybrid drive apparatus according to claim 1, wherein the hybrid drive apparatus is configured to drive using the first motor or the second motor,
wherein the hybrid drive apparatus has a first mode in which the second motor is rotated, the first and second clutches are released, and the first motor is driven to rotate in a normal direction, and
wherein the hybrid drive apparatus has a second mode in which the second clutch is engaged, the first clutch is released, the second motor is stopped, and the first motor is driven to rotate in the normal direction.

8. The hybrid drive apparatus according to claim 2, wherein the hybrid drive apparatus is configured to drive using the first motor or the second motor,
wherein the hybrid drive apparatus has a first mode in which the second motor is rotated, the first and second clutches are released, and the first motor is driven to rotate in a normal direction, and wherein the hybrid drive apparatus has a second mode in which the second clutch is engaged, the first clutch is released, the second motor is stopped, and the first motor is driven to rotate in the normal direction.

* * * * *